US009954366B2

(12) United States Patent
Mehta et al.

(10) Patent No.: US 9,954,366 B2
(45) Date of Patent: Apr. 24, 2018

(54) GRID POWER FACTOR CONTROL SYSTEM

(71) Applicant: General Electric Company, Schenectady, NY (US)

(72) Inventors: Amit Mehta, Udaipur (IN); Guy Lamarque, Le Creusot (FR)

(73) Assignee: General Electric Company, Schenectady, NY (US)

( * ) Notice: Subject to any disclaimer, the term of this patent is extended or adjusted under 35 U.S.C. 154(b) by 135 days.

(21) Appl. No.: 14/436,631

(22) PCT Filed: Jul. 11, 2013

(86) PCT No.: PCT/IB2013/001720
§ 371 (c)(1),
(2) Date: Apr. 17, 2015

(87) PCT Pub. No.: WO2015/004493
PCT Pub. Date: Jan. 15, 2015

(65) Prior Publication Data
US 2016/0164293 A1   Jun. 9, 2016

(51) Int. Cl.
*G05B 15/02*  (2006.01)
*H02J 3/18*  (2006.01)

(52) U.S. Cl.
CPC ............ *H02J 3/18* (2013.01); *G05B 15/02* (2013.01); *Y02E 40/30* (2013.01)

(58) Field of Classification Search
CPC ............ G05B 15/02; H02J 3/18; Y02E 40/30
USPC .......................................... 700/286
See application file for complete search history.

(56) References Cited

U.S. PATENT DOCUMENTS

| 2,441,995 | A | | 5/1948 | Dolan |
| 3,634,750 | A | | 1/1972 | Bobo |
| 3,968,422 | A | | 7/1976 | Waldmann |
| 4,172,234 | A | | 10/1979 | Gyugyi et al. |
| 5,134,356 | A | * | 7/1992 | Ei-Sharkawi ......... H02J 3/1864 323/209 |
| 5,422,561 | A | | 6/1995 | Williams et al. |

(Continued)

FOREIGN PATENT DOCUMENTS

EP   2482421 A1   8/2012

OTHER PUBLICATIONS

PCT/IB2013/001720, International Search Report, dated Sep. 7, 2014, 4 pages.

*Primary Examiner* — Chun Cao
(74) *Attorney, Agent, or Firm* — Ernest G. Cusick; Hoffman Warnick LLC

(57) ABSTRACT

Various embodiments of the invention include a system including: at least one computing device operably connected with a location on a power grid, the at least one computing device configured to control a power factor at the location on the power grid by performing actions including: determining a phase angle at the location on the power grid in degrees; converting the phase angle to radians from degrees; determining a reactive power exported at the location on the power grid based upon the phase angle in radians and an exported mega-watt measurement at the location on the power grid; and determining the power factor at the location on the power grid based upon the phase angle in radians and the reactive power exported at the location on the power grid.

20 Claims, 3 Drawing Sheets

(56) References Cited

U.S. PATENT DOCUMENTS

| | | | |
|---|---|---|---|
| 6,397,157 B1* | 5/2002 | Hogle | G01R 19/2513 |
| | | | 324/107 |
| 6,462,519 B1 | 10/2002 | McDaniel et al. | |
| 6,700,358 B2* | 3/2004 | McDaniel | G05F 1/70 |
| | | | 323/211 |
| 7,808,126 B2* | 10/2010 | Stiesdal | H02J 3/1835 |
| | | | 307/57 |
| 8,120,340 B2 | 2/2012 | Chen et al. | |
| 8,120,347 B1 | 2/2012 | Cao | |
| 8,130,522 B2 | 3/2012 | Maksimovic | |
| 8,143,800 B2 | 3/2012 | Liu et al. | |
| 8,461,823 B2* | 6/2013 | de Buda | H04B 3/56 |
| | | | 324/110 |
| 8,508,070 B2* | 8/2013 | Deaver, Sr. | G05F 1/70 |
| | | | 307/29 |
| 2002/0106108 A1 | 8/2002 | Benson et al. | |
| 2002/0140406 A1 | 10/2002 | Sumiya et al. | |
| 2008/0112919 A1 | 5/2008 | Satchi-Fainaro et al. | |
| 2008/0166357 A1 | 7/2008 | Golz et al. | |
| 2010/0001698 A1 | 1/2010 | Johnson | |
| 2010/0097041 A1 | 4/2010 | Ayukawa et al. | |
| 2010/0109615 A1 | 5/2010 | Hwang et al. | |
| 2010/0208501 A1* | 8/2010 | Matan | H02J 3/18 |
| | | | 363/95 |
| 2011/0071695 A1 | 3/2011 | Kouroussis et al. | |
| 2011/0074215 A1 | 3/2011 | Vartanian et al. | |
| 2013/0107598 A1 | 5/2013 | Rojas | |

\* cited by examiner

GRID POWER FACTOR CONTROL SYSTEM

FIELD OF THE INVENTION

The subject matter disclosed herein relates to power generation systems. More particularly, the subject matter disclosed herein relates to managing power in a distributed industrial power generation system.

BACKGROUND OF THE INVENTION

Distributed power systems include a plurality of power generators (e.g., power generation plants) connected to a grid. The grid, in turn, is connected with a plurality of end users. While controlling and/or monitoring electrical properties of the distributed power system is commonly performed at the distribution side, monitoring and/or controlling of particular properties can be more challenging at the grid side of the network.

BRIEF DESCRIPTION OF THE INVENTION

Various embodiments of the invention include a system including: at least one computing device operably connected with a location on a power grid, the at least one computing device configured to control a power factor of the location on the power grid by performing actions including: determining a phase angle at the location on the power grid in degrees; converting the phase angle to radians from degrees; determining a reactive power exported at the location on the power grid based upon the phase angle in radians and an exported mega-watt measurement at the location on the power grid; and determining the power factor of the location on the power grid based upon the phase angle in radians and the reactive power exported at the location on the power grid.

A first aspect of the invention includes a system having: at least one computing device operably connected with a location on a power grid, the at least one computing device configured to control a power factor of the location on the power grid by performing actions including: determining a phase angle at the location on the power grid in degrees; converting the phase angle to radians from degrees; determining a reactive power exported at the location on the power grid based upon the phase angle in radians and an exported mega-watt measurement at the location on the power grid; and determining the power factor of the location on the power grid based upon the phase angle in radians and the reactive power exported at the location on the power grid.

A second aspect of the invention includes a system having: a control system operably connected with a location on a power grid, the control system configured to control a power factor of the location on the power grid by performing actions including: determining a phase angle at the location on the power grid in degrees; converting the phase angle to radians from degrees; determining a reactive power exported at the location on the power grid based upon the phase angle in radians and an exported mega-watt measurement at the location on the power grid; determining the power factor of the location on the power grid based upon the phase angle in radians and the reactive power exported at the location on the power grid; and instructing an exciter circuit to modify an excitation pulse to the location on the power grid based on the determined power factor.

A third aspect of the invention includes a computer program product including program code, which when executed by at least one computing device connected with a location on a power grid, controls a power factor of the location on the power grid by performing actions including: determining a phase angle at the location on the power grid in degrees; converting the phase angle to radians from degrees; determining a reactive power exported at the location on the power grid based upon the phase angle in radians and an exported mega-watt measurement at the location on the power grid; and determining the power factor of the location on the power grid based upon the phase angle in radians and the reactive power exported at the location on the power grid.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
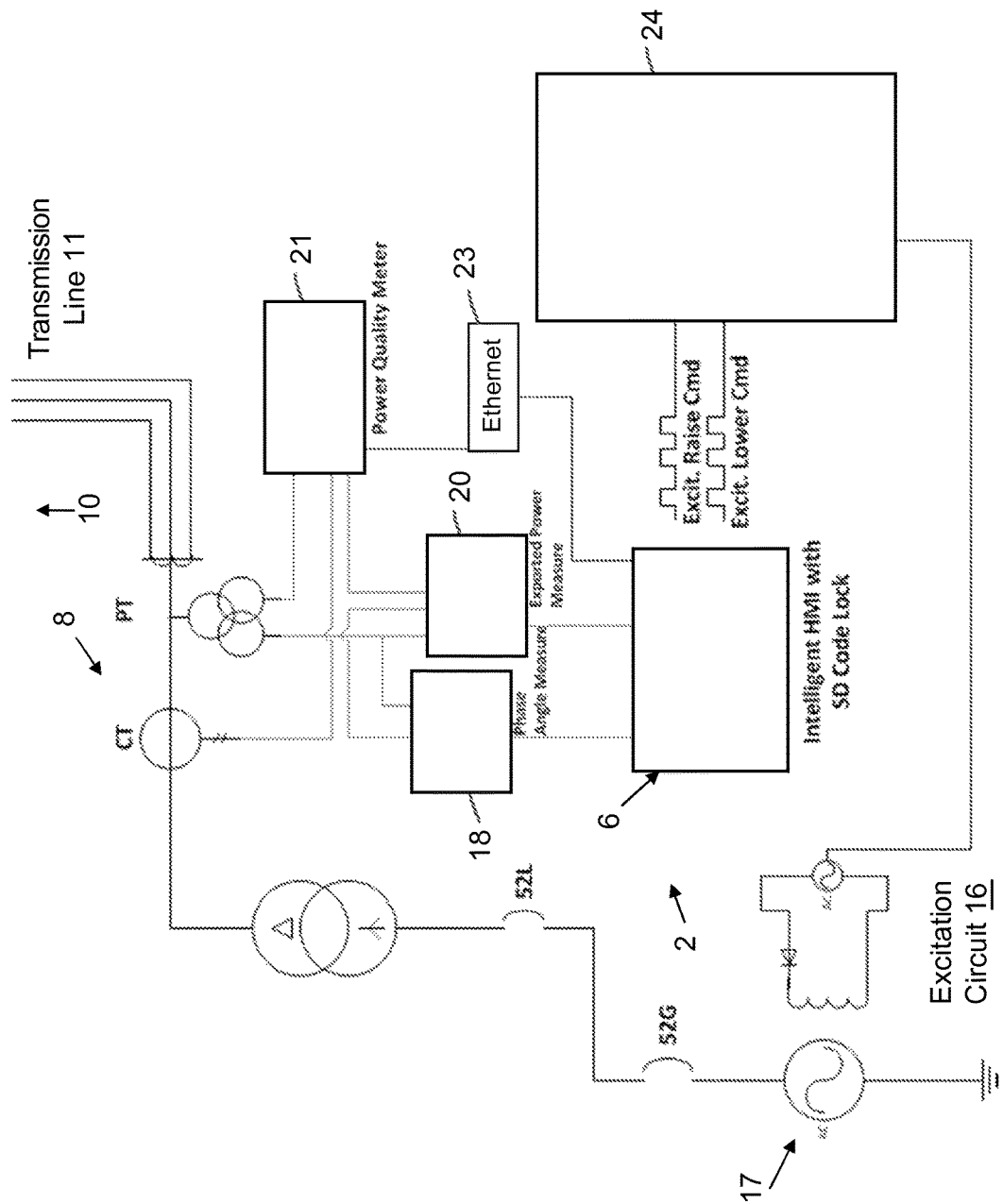
FIG. 1 shows a schematic depiction of an environment including a system according to various embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention relate to power generation systems. More particularly, the subject matter disclosed herein relates to managing power in a distributed power generation system.

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Various particular embodiments of the invention include a system having: at least one computing device operably connected with a location on a power grid, the at least one computing device configured to control a power factor of the location on the power grid by performing actions including: determining a phase angle at the location on the power grid in degrees; converting the phase angle to radians from degrees; and determining the power factor of the location on the power grid based upon the phase angle in radians and a reactive power exported at the location on the power grid.

Various additional particular embodiments of the invention include a system having: a control system operably connected with a location on the power grid, the control system configured to control a power factor of the location on the power grid by performing actions including: determining a phase angle at the location on the power grid in degrees; converting the phase angle to radians from degrees; determining the power factor of the location on the power grid based upon the phase angle in radians and a reactive power exported at the location on the power grid; and instructing an exciter circuit to modify an excitation pulse to the power grid based on the determined power factor.

Various other particular embodiments of the invention include a computer program product including program code, which when executed by at least one computing device connected with a location on a power grid, controls a power factor of the location on the power grid by performing actions including: determining a phase angle at the location on the power grid in degrees; converting the phase angle to radians from degrees; and determining the power factor of the location on the power grid based upon the phase angle in radians and a reactive power exported at the location on the power grid.

FIG. 1 shows a schematic depiction of an environment including a system 2 according to various embodiments of the invention. As shown, the system 2 can include at least one computing device (or simply, computing device) 6, which in some cases, can include a human machine interface (HMI), allowing a user such as a human user to interact with the computing device 6 to control one or more functions of the computing device 6. The computing device 6 can include a control system 26 (FIG. 3) that can be configured to monitor and/or control a power factor at the power grid (e.g., via excitation circuit 16 and power source 17), as described herein. The computing device 6 is connected with a location 8 on a power grid 10, via one or more devices as described herein. The location 8 on the power grid 10 can include any location along the power grid 10 that is separated from a power generator (e.g., a power plant) and an end user location (e.g., a residence, facility, etc.). In particular embodiments, the location 8 on the power grid 10 includes an individual power station. In various embodiments, the location 8 on the power grid 10 includes a transmission line 11 on the power grid 10. The computing device 6, as described herein, can be configured to control a power factor at the location 8 on the power grid 10.

Figure 3:
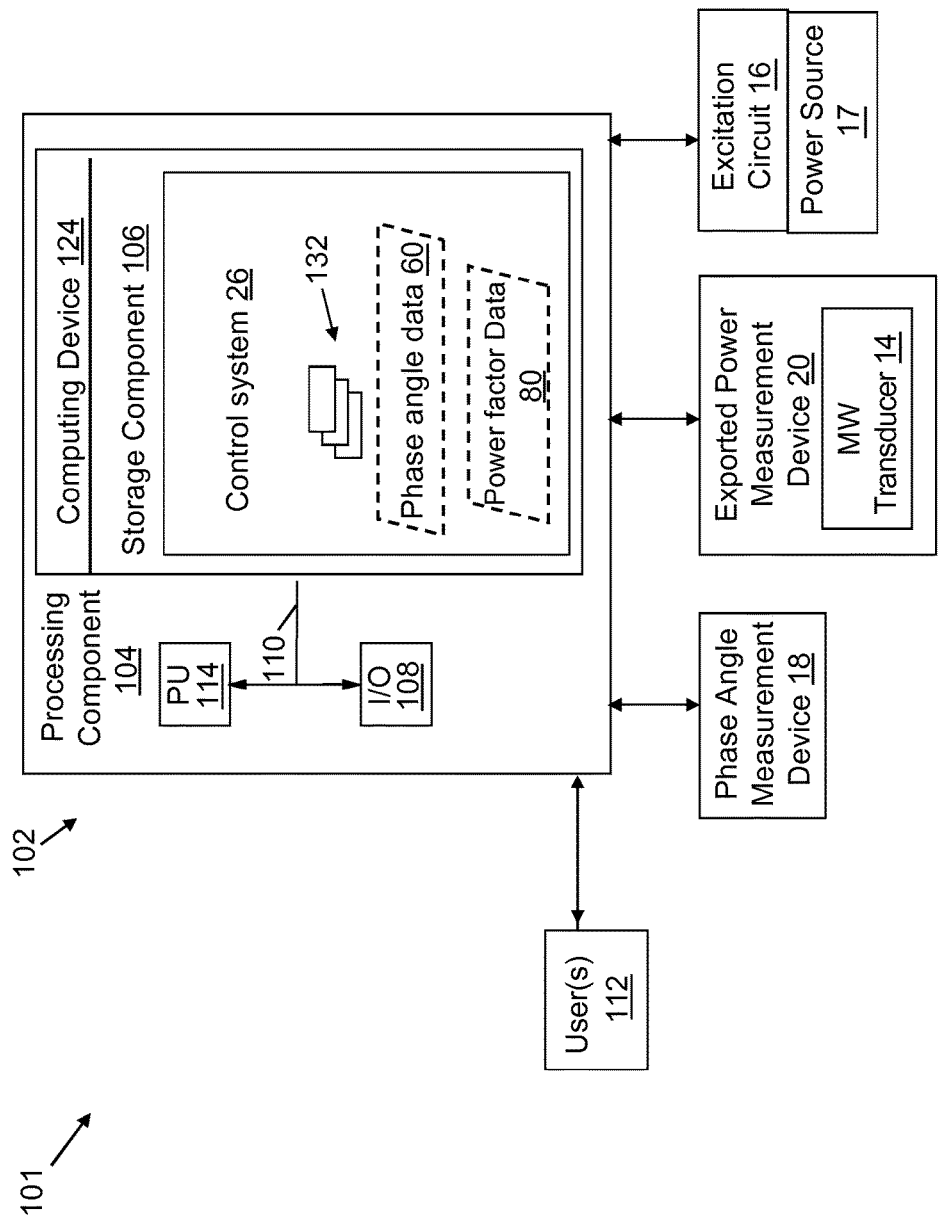
FIG. 3 shows an environment for performing various functions according to embodiments of the invention.

The system 2 can further include an exported power measurement device 20 (e.g., including a mega-watt (MW) transducer 14, FIG. 3) located at (e.g., connected to) the location 8 on the power grid 10. The MW transducer 14 can be operably connected with (e.g., hard-wired or wirelessly connected with) the computing device 6, and can be configured to measure the phase angle of a transmission signal at the location 8 on the power grid. The phase angle can be used to compute the reactive power at the location 8, and the MW transducer 14 can be used to determine the exported power (active power) at the location 8 according to various embodiments. It is understood that the MW transducer 14 can be used to measure the "active power" at the location 8 on the power grid, where the "active power" is equivalent to the mega-watts exported at the location 8 on the power grid.

The system 2 can further include an excitation circuit 16 operably connected (e.g., wirelessly and/or hard-wired) with the computing device 6 and the power grid 10 (e.g., at the location 8). The excitation circuit 16 can provide an excitation pulse to the location 8 on the power grid 10, e.g., in response to receiving a command from the computing device 6. As shown herein, the excitation circuit 16 is coupled with a power source 17, which can include an alternating current (AC) generator, alternator, or other conventional power source. As described herein, the excitation circuit 16 can provide the excitation pulse to the power source 17, which in turn provides excitation to the location 8 on the power grid 10.

The system 2 can further include a phase angle measurement device 18 operably connected (e.g., electrically connected) with the location 8 on the power grid 10. The phase angle measurement device 18 can also be connected with the computing device 6 (e.g., wirelessly and/or hard/wired). The phase angle measurement device 18 can determine the phase angle of a transmission signal at the location 8 on the power grid 10.

The system 2 can further include an exported power measurement device 20 operably connected (e.g., electrically connected) with the location 8 on the power grid 10. The exported power measurement device 20 can also be connected (e.g., wirelessly and/or hard/wired) with the computing device 6. The system 2 can further include a power quality meter 21, operably connected to the computing device 6 via a communication protocol (e.g., Ethernet) 23 and connected with the location 8 on the power grid 10.

In various embodiments, the computing device 6 can be configured to perform the following:

A) Determine a phase angle at the location 8 on the power grid 10 in degrees. In various embodiments, the phase angle at the location 8 is measured by the phase angle measurement device 18, which is coupled with the computing device 6. The computing device 6 can obtain information about the phase angle a the location 8 in degrees, e.g., by periodically or continuously polling the phase angle measurement device 18, continuously obtaining information about the phase angle at the location 8, etc.;

B) Convert the phase angle to radians from degrees. In various embodiments, the computing device 6 is configured to convert the measured phase angle at the location 8 to radians from degrees. In various embodiments, the computing device 6 calculates a tangent ((tan θ)*(tan θ)actual) of the measured phase angle, and converts that tangent of the measured angle into degrees using conventional angle conversion techniques;

C) determining a reactive power exported (KVAR) at the location 8 on the power grid based upon the phase angle in radians and an exported mega-watt measurement at the location 8 on the power grid. The exported mega-watt measurement can be obtained by the exported power measurement device 20 (e.g., including a mega-watt (MW) transducer 14, FIG. 3), and can be obtained continuously, periodically, and/or on demand; and D) determining the power factor of the location 8 on the power grid 10 based upon the phase angle in radians and the reactive power exported (KVAR) the location 8 on the power grid 10.

In various embodiments, the process of determining (and regulating) of the power factor of the location 8 on the power grid 10 includes comparing the power factor of the location 8 (measured at the location) with a power factor setpoint. In various embodiments, the power factor is compared in radians with the power factor setpoint, however, in other embodiments, the power factor is compared in degrees with the power factor setpoint. In various embodiments, the power factor setpoint is calculated based upon the reactive power exported (in KVAR) at the location 8 on the grid 10. In various other embodiments, the power factor setpoint can be dictated by an operator, e.g., a human operator and/or control system. The power factor setpoint can be entered into the computing device 6, e.g., by the operator or via a connected control system. That reactive power exported (KVAR) can be calculated according to the following equation:

$$KVAR(exported) = KW(exported) * Tan(\theta) actual \quad \text{(Equation 1)}$$

The KW (exported) is measured by the exported power measurement device 20 (which may include the MW transducer 14).

According to various embodiments, the computing device 6 is further configured to instruct the excitation circuit 16 to modify an excitation pulse applied to the power grid 10 (e.g., via an alternating current source such as a generator or an alternator). As shown, the excitation circuit 16 can be operably connected with an excitation panel 24, which receives the instructions from the computing device 6 for modifying the excitation pulse. In these embodiments, the computing device 6 compares the power factor of the location 8 with the power factor setpoint in equivalent reactive power terms in order to determine whether the power factor of the location 8 is lagging or leading, and therefore requires the excitation circuit 16 to modify an excitation pulse to the grid 10, e.g., via the alternating current source such as a generator and/or alternator).

The power factor setpoint is determined to be lagging or leading based upon its value. In some cases, the power factor setpoint includes a range from leading to lagging, depending upon operating requirements, e.g. −0.8 to +1, and when determining that a power factor falls outside of the range, the computing device 6 can provide instructions to the excitation circuit 16 to modify the excitation pulse to the grid 10 (e.g., via power source 17). In various embodiments, the computing device 6 is configured to manage the correction of the power factor to the location 8 by performing actions including:

I) detecting an error between the reactive power (measured) and the equivalent reactive power setpoint derived based on the power factor reference (if such an error exists);

II) determining whether the error is within the dead band (e.g., within a setpoint range such as between values zero (0) and one (1)), below the dead band (less than zero), or above the dead band (greater than one); and III) providing instructions to the excitation circuit 16 (and power source 17) for: a) increasing the excitation pulse in response to determining the error is positive (above zero), or b) providing instructions for decreasing the excitation pulse in response to determining the error is negative (below zero).

Figure 2:
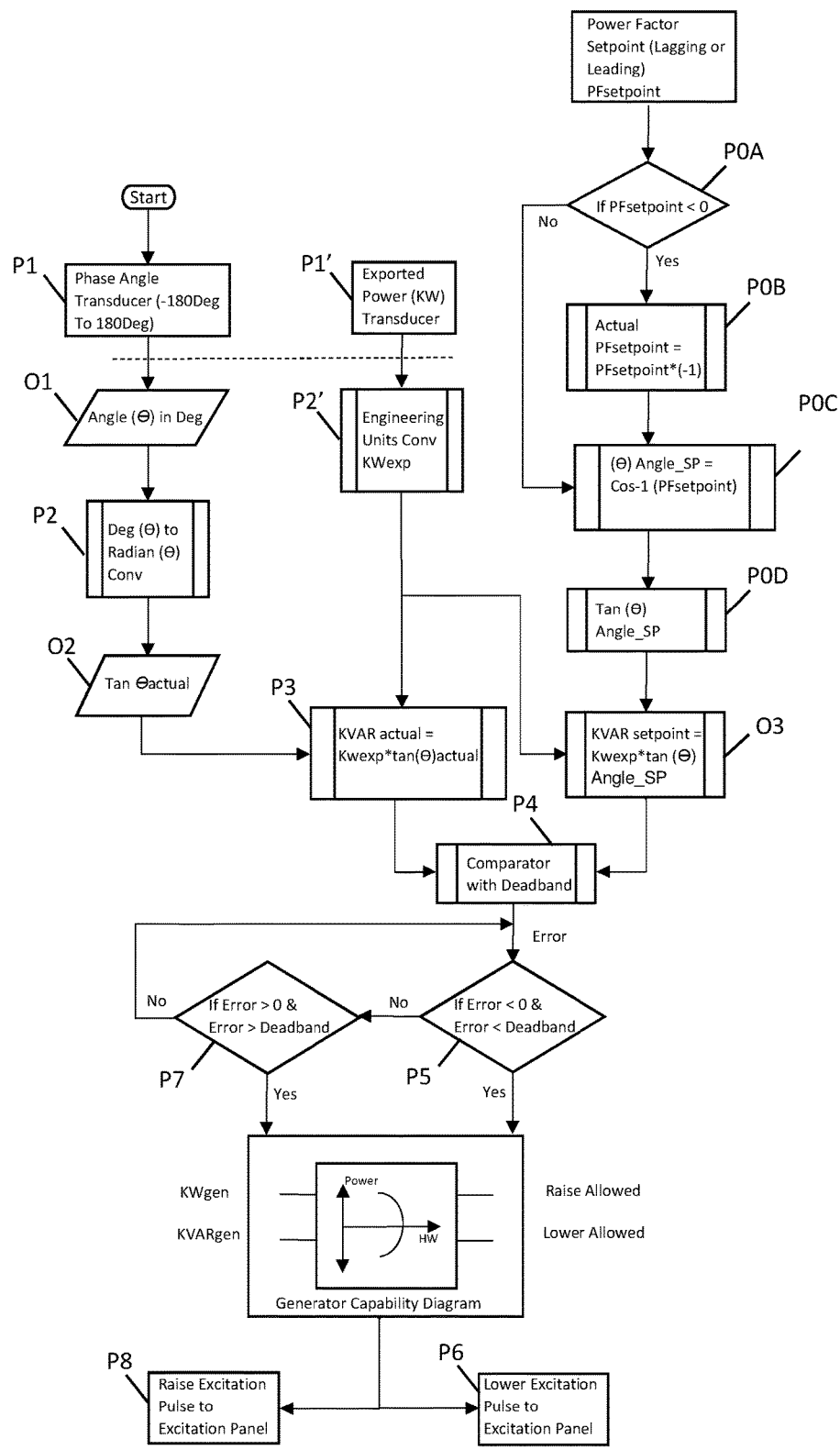
FIG. 2 is a flow diagram illustrating a process according to various embodiments of the invention.

FIG. 2 shows a flow diagram illustrating processes performed in order to monitor and/or modify a power factor at a power grid location 10, e.g., a power source (e.g., to the transmission line 11 connected to a power grid) according to various embodiments of the invention. As shown, a first process P1 can include measuring a phase angle (O1) of a transmission signal using a phase angle transducer. After measuring the phase angle (O1), the phase angle is converted from radians to degrees (process P2), providing Tan (θ)actual (O2). At a same or different time, process P1'-P2' can be performed, including: measuring an exported power (in kilo-watts) using a transducer (P1'), converting the exported power measurement to KWexp units (P2'), and calculating an exported reactive power (power factor) (KVAR(actual)) using the KWexp value and the Tan (θ)actual value. This exported reactive power (KVAR(actual)) can then be compared with a reactive power (KVAR) setpoint (object O3) (process P4), e.g., a desired reactive power derived from the power factor setpoint and megawatts exported.

In an optional pre-process, the power factor setpoint is compared with a lagging/leading threshold (e.g., zero). In pre process P0A, the preliminary power factor setpoint (PFsetpoint) (object O4) is compared to the threshold (zero) to determine whether it is less than zero. If the PFsetpoint is less than zero, process P0B includes setting the actual PF setpoint equal to: (PFsetpoint×(−1)). Process P0C then includes setting (θ) Angle Setpoint equal to: (Cos$^{-1}$(PFsetpoint). If PFsetpoint is equal to or greater than zero, the process proceeds to P0C from P0A.

After process P0C, process P0D then includes converting the (θ) Angle Setpoint to Tan(θ)Angle_Setpoint. Process P0E then includes setting the KVAR setpoint (object O3) equal to: KWexp×Tan(θ)Angle_Setpoint.

As described above, process P4 then includes comparing the exported reactive power (KVAR(actual)) with a desired reactive power exported setpoint (derived from the desired power factor setpoint) (KVAR) setpoint (object O3) (process P4). In the case that there is an error between the KVAR actual and KVAR setpoint, the process includes comparing the error with a (equivalent) reactive power setpoint threshold and a deadband threshold. In process P5, the error is compared with the reactive power setpoint threshold, and the deadband threshold, and if the error is negative (less than zero) and less than the deadband threshold, the process proceeds to P6, providing instructions to decrease the excitation pulse to the excitation panel coupled to the location 8 on the grid (e.g., via the power source 17). Where the error is not less than zero and not less than the deadband (P5), process P7 can include determining whether the error is positive (greater than zero) and greater than the deadband, and if so, process P8 includes providing instructions to raise the excitation pulse to the excitation circuit 16 and power source 17 (e.g., to the transmission line 11 connected to power grid 10).

FIG. 3 shows an illustrative environment 101 including a control system 26, for performing the functions described herein according to various embodiments of the invention. To this extent, the environment 101 includes a computer system 102 that can perform one or more processes described herein in order to monitor a component within a turbomachine. In particular, the computer system 102 is shown as including the control system 26, which makes computer system 102 operable to monitor and/or control a power factor at a location on a power grid (via a power source 17 to that grid) by performing any/all of the processes described herein and implementing any/all of the embodiments described herein.

The computer system 102 is shown including a computing device 124, which can include a processing component 104 (e.g., one or more processors), a storage component 106 (e.g., a storage hierarchy), an input/output (I/O) component 108 (e.g., one or more I/O interfaces and/or devices), and a communications pathway 110. In general, the processing component 104 executes program code, such as the control system 26, which is at least partially fixed in the storage component 106. While executing program code, the processing component 104 can process data, which can result in reading and/or writing transformed data from/to the storage component 106 and/or the I/O component 108 for further processing. The pathway 110 provides a communications link between each of the components in the computer system 102. The I/O component 108 can comprise one or more human I/O devices, which enable a user (e.g., a human and/or computerized user) 112 to interact with the computer system 102 and/or one or more communications devices to enable the system user 112 to communicate with the computer system 102 using any type of communications link. To this extent, the control system 26 can manage a set of interfaces (e.g., graphical user interface(s), application program interface, etc.) that enable human and/or system users 112 to interact with the control system 26. Further, the control system 26 can manage (e.g., store, retrieve, create, manipulate, organize, present, etc.) data, such as phase angle data 60 and/or power factor data 80 using any solution. The control system 26 can additionally communicate with the phase angle measurement device 18, exported power measurement device 20, excitation circuit 16 and power source 17 via wireless and/or hardwired means.

In any event, the computer system 102 can comprise one or more general purpose computing articles of manufacture (e.g., computing devices) capable of executing program code, such as the control system 26, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the control system 26 can be embodied as any combination of system software and/or application software. It is further understood that the control system 26 can be implemented in a cloud-based computing environment, where one or more processes are performed at distinct computing devices (e.g., a plurality of computing devices 24), where one or more of those distinct computing devices may contain only some of the components shown and described with respect to the computing device 124 of FIG. 3.

Further, the control system 26 can be implemented using a set of modules 132. In this case, a module 132 can enable the computer system 102 to perform a set of tasks used by the control system 26, and can be separately developed and/or implemented apart from other portions of the control system 26. As used herein, the term "component" means any configuration of hardware, with or without software, which implements the functionality described in conjunction therewith using any solution, while the term "module" means program code that enables the computer system 102 to implement the functionality described in conjunction therewith using any solution. When fixed in a storage component 106 of a computer system 102 that includes a processing component 104, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of the computer system 102.

When the computer system 102 comprises multiple computing devices, each computing device may have only a portion of control system 26 fixed thereon (e.g., one or more modules 132). However, it is understood that the computer system 102 and control system 26 are only representative of various possible equivalent computer systems that may perform a process described herein. To this extent, in other embodiments, the functionality provided by the computer system 102 and control system 26 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 102 includes multiple computing devices 24, the computing devices can communicate over any type of communications link. Further, while performing a process described herein, the computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

The computer system 102 can obtain or provide data, such as phase angle data 60 and/or power factor data 80 using any solution. The computer system 102 can generate phase angle data 60 and/or power factor data 80, from one or more data stores, receive phase angle data 60 and/or power factor data 80, from another system such as the phase angle measurement device 18 and/or exported power measurement device 20 and/or the user 112, send phase angle data 60 and/or power factor data 80 to another system, etc.

While shown and described herein as a method and system for monitoring and/or controlling a power factor at a power grid location, it is understood that aspects of the invention further provide various alternative embodiments. For example, in one embodiment, the invention provides a computer program fixed in at least one computer-readable medium, which when executed, enables a computer system to monitor and/or control a power factor at a power grid location. To this extent, the computer-readable medium includes program code, such as the control system 26 (FIG. 3), which implements some or all of the processes and/or embodiments described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; etc.

In another embodiment, the invention provides a method of providing a copy of program code, such as the control system 26 (FIG. 3), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of monitoring and/or controlling a power factor at a power grid location (e.g., an individual power station). In this case, a computer system, such as the computer system 102 (FIG. 4), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; etc.

In any case, the technical effect of the various embodiments of the invention, including, e.g., the control system 26, is to monitor and/or control a power factor at a power grid location, e.g., at one or more individual power system(s).

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A system comprising:
   a power grid; and
   at least one computing device operably connected with a location on the power grid, the at least one computing device configured to control a power factor of the location on the power grid by performing actions including:
   determining a phase angle at the location on the power grid in degrees;
   converting the phase angle to radians from degrees;
   determining a reactive power exported at the location on the power grid based upon the phase angle in radians and an exported mega-watt measurement at the location on the power grid;
   determining the power factor at the location on the power grid based upon the phase angle in radians and the reactive power exported at the location on the power grid; and
   instructing an exciter circuit to modify an excitation pulse to the location on the power grid based on the determined power factor.

2. The system of claim 1, further comprising a mega-watt transducer located at the location on the power grid and operably connected with the at least one computing device, the mega-watt transducer measuring the phase angle and an active power exported at the location on the power grid.

3. The system of claim 1, wherein the determining of the power factor of the location on the power grid includes comparing the power factor of the location on the power grid with a power factor setpoint in equivalent reactive power terms.

4. The system of claim 3, wherein the instructing occurs after the comparing of the power factor of the location on the power grid in radians with the power factor setpoint in equivalent reactive power terms.

5. The system of claim 1, wherein the modifying of the excitation pulse includes:
   detecting an error between the power factor and the power factor setpoint in equivalent reactive power terms;
   determining whether the error is within an error range, below the error range, or above the error range; and
   providing instructions for decreasing the excitation pulse in response to determining the error is negative and below the error range, or providing instructions for increasing the excitation pulse in response to determining the error is positive and above the error range.

6. The system of claim 1, wherein the location on the power grid includes an individual power station.

7. The system of claim 1, wherein the location on the power grid includes a power source.

8. The system of claim 1, wherein the power grid includes a transmission line, and the at least one computing device is operably connected with the transmission line.

9. A system comprising:
   a control system operably connected with a location on a power grid, the control system configured to control a power factor of the location on the power grid by performing actions including:
   determining a phase angle at the location on the power grid in degrees;
   converting the phase angle to radians from degrees;
   determining a reactive power exported at the location on the power grid based upon the phase angle in radians and an exported mega-watt measurement at the location on the power grid;
   determining the power factor at the location on the power grid based upon the phase angle in radians and the reactive power exported at the location on the power grid; and instructing an exciter circuit to modify an excitation pulse to the location on the power grid based on the determined power factor.

10. The system of claim 9, further comprising a mega-watt transducer located at the location on the power grid and operably connected with the control system, the mega-watt transducer for measuring an active power exported at the location on the power grid.

11. The system of claim 9, wherein the determining of the power factor of the location on the power grid includes comparing the power factor at the location on the power grid a power factor setpoint in equivalent reactive power terms.

12. The system of claim 11, wherein the control system is further configured to perform actions including:
   detecting an error between the power factor and the power factor setpoint;
   determining whether the error is within an error range, below the error range, or above the error range; and
   providing instructions for decreasing the excitation pulse in response to determining the error is negative and below the error range, or providing instructions for increasing the excitation pulse in response to determining the error is positive and above the error range.

13. The system of claim 12, further comprising an excitation circuit operably connected with the control system and the location on the power grid, the excitation circuit for providing the excitation pulse to AC Source or generator or alternator at the location on the power grid.

14. The system of claim 9, further comprising a phase angle measurement device operably connected with the location on the power grid and the control system, the phase angle measurement device for determining the phase angle at the location on the power grid.

15. The system of claim 14, further comprising an exported power measurement device operably connected with the location on power grid and the control system.

16. The system of claim 9, wherein the power grid includes a transmission line, and the control system is operably connected with the transmission line.

17. The system of claim 9, wherein the location on the power grid include an individual power station.

18. A non-transitory computer readable medium comprising program code, which when executed by at least one computing device connected with a location on the power grid, causes the at least one computing device to control a power factor of the location on the power grid by performing actions including:
   determining a phase angle at the location on the power grid in degrees;
   converting the phase angle to radians from degrees;
   determining a reactive power exported at the location on the power grid based upon the phase angle in radians and an exported mega-watt measurement at the location on the power grid;
   determining the power factor at the location on the power grid based upon the phase angle in radians and the reactive power exported at the location on the power grid; and
   instructing an exciter circuit to modify an excitation pulse to the location on the power grid based on the determined power factor.

19. The computer readable medium of claim 18, wherein the determining of the power factor of the location on the power grid includes comparing the power factor of the location on the power grid in radians with a power factor setpoint in reactive power terms.

20. The computer readable medium of claim 19,
   wherein instructing an exciter circuit to modify an excitation pulse to the location on the power grid based on the determined power factor occurs after the comparing of the power factor of the location on the power grid with the power factor setpoint.

* * * * *